No. 818,175. PATENTED APR. 17, 1906.
C. E. HOWE, B. F. RIX & E. P. HOLDEN.
WHEEL AND PROCESS OF MAKING THE SAME.
APPLICATION FILED SEPT. 16, 1905.

Witnesses
W. M. Gentte
N. Allemong

Inventors
Charles E. Howe,
Benjamin F. Rix,
Edward P. Holden,
By V. H. Lockwood
Attorney

UNITED STATES PATENT OFFICE.

CHARLES E. HOWE, OF WABASH, INDIANA, BENJAMIN F. RIX, OF KALAMAZOO, MICHIGAN, AND EDWARD P. HOLDEN, OF CHICAGO, ILLINOIS, ASSIGNORS TO WABASH MANUFACTURING COMPANY, OF WABASH, INDIANA, A CORPORATION OF INDIANA.

WHEEL AND PROCESS OF MAKING THE SAME.

No. 818,175.   Specification of Letters Patent.   Patented April 17, 1906.

Application filed September 16, 1905. Serial No. 278,819.

*To all whom it may concern:*

Be it known that we, CHARLES E. HOWE, a resident of Wabash, in the county of Wabash and State of Indiana, BENJAMIN F. RIX, a resident of Kalamazoo, in the county of Kalamazoo and State of Michigan, and EDWARD P. HOLDEN, a resident of Chicago, in the county of Cook and State of Illinois, citizens of the United States, have invented a certain new and useful Wheel and Process of Making the Same; and we do hereby declare that the following is a full, clear, and exact description thereof, reference being had to the accompanying drawings, in which like figures refer to like parts.

The object of this invention is to provide a metal wheel that can be cheaply and conveniently constructed and at the same time be strong and durable.

One feature of the construction results from the manner of making the wheel, consisting in providing the rim of the wheel with apertures for the insertion of the outer ends of the spokes, then inserting said spokes in the rim of the wheel with a bend on them which will cause them to hold in position, then providing a pair of hub-plates with punched openings into which alternately the other ends of the spokes may be easily inserted, then securing the spokes in said hub-plates by pressing the punched-out tongues down upon the ends of the spokes, and, lastly, spreading the two hub-plates apart and securing them to the ends of the hub-tube. This construction by reason of the spreading apart of the hub-plates secures the desired tension of the spokes and makes a strong and durable wheel and yet one which can be cheaply and easily assembled.

The full nature of the invention will be understood from the accompanying drawings and the following description and claims.

Figure 1:
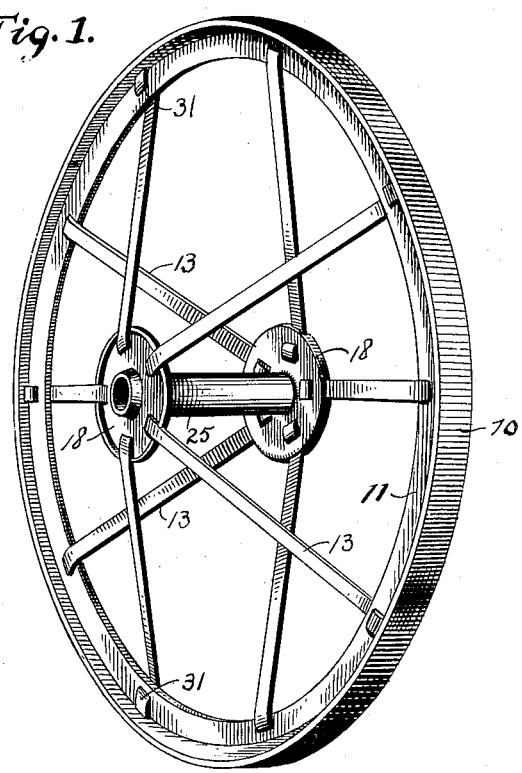
Figure 2:
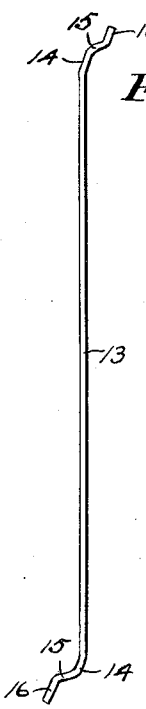
Figure 3:
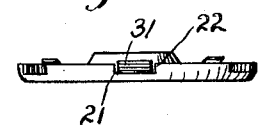
Figures 4, 5, 6:
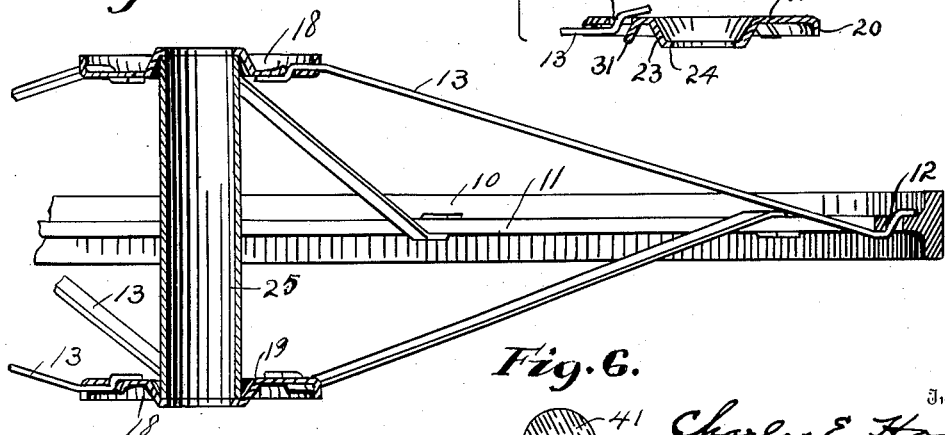

In the drawings, Figure 1 is a perspective view of the wheel. Fig. 2 is an elevation of the lateral edge of one of the spokes. Fig. 3 is a similar elevation of one of the hub-plates. Fig. 4 is a central section through the two hub-plates and the two spokes at the time the spokes are first inserted in said hub-plates and before they are secured. Fig. 5 is a transverse section of a portion of the wheel passing through the hub, along one spoke, and through the rim at one side. Fig. 6 is a section through the tire and rim of a rubber-tired wheel formed in the same manner as the metal wheel.

While we show an all-metal wheel with a metal tread for the purpose of explaining the nature of the invention, we do not wish to be limited to any particular form of the rim or tire, as it may be modified in many ways to suit the needs of different people; but in the form shown herein to explain the invention there is seen a metal frame 10 with a flat tread and having an inwardly-extending and centrally-located annular flange 11. This flange has spoke-holes 12 at various points. These spoke-holes are preferably transversely extended through the flange.

The spokes 13 are flat metal strips bent at one end so as to have the surfaces 14, 15, and 16. The bend 14 is at a slight angle from a line extending longitudinally through the spoke. The portion 15 is nearly at a right angle to said line. The end portion 16 is nearly parallel with a line running through the portion 14, as seen in Figs. 2 and 5. However, this form is not so defined in the spoke. The end described is to be connected with the rim of the wheel. The other end is somewhat similarly formed to extend in an opposite direction and is adapted to be connected with hub-plates 18 and 19.

The hub-plates are formed, as shown in Figs. 3 and 4, in the form of plates with their edges turned at 20 to form a downwardly-extending flange and being notched at 21, so as to provide notches through which the spokes may pass, and the sides of the notches 22 are shoulders for holding the spokes from lateral movement relatively to the plates or the plates from rotary movement relatively to the spokes.

Each plate has a central opening and is punched to have a central flange 23, that extends away from the plate in the same direction as the rim-flange 20. The outer edge of the metal flanges 23 in the two plates are made somewhat differently. In the lower plate (shown in Figs. 4 and 5) there is an inner annular flange 24 parallel with the main body of the plate, upon which the lower end of the hub-tube 25 is adapted to rest when put in place against it. The external diameters of the metal flange 23 and the plate 19 adjacent to the annular flange 24 are the same. The other plate 18 is not provided with the annular flange 24; but the outer edge of the flange 23 is extended somewhat, so that after said plate is placed upon the upper end of the hub-tube 25 said extended portion or outer edge of the flange 23 may be pressed in by suitable machinery upon the tube 25, as shown in Fig. 5.

The manner of assembling is as follows: The spokes are inserted in the rim-openings 12 by hand. Then the inner ends of the spokes are inserted very easily in the openings 30 of the hub-plates. These openings 30 are made by punching out tongues 31 in the same direction from the plate as the middle and peripheral flanges extend. A large enough tongue is punched out to leave a large opening 30, so that the inner spokes may be inserted, the plates during such process of the manufacture being relatively close together. The plates can be turned or twisted slightly to enable the inner ends of every spoke to be inserted, as shown in Fig. 4. After the spokes are thus inserted in the hub-plates the wheel is placed in a press or suitable machine with the plate 19 downward and the hub-tube 25 resting therein, as shown in Fig. 5. Then the machine depresses the plate 19 away from the plate 18, and the hub-tube 25 is slipped down through the plate 18 until the lower end of the tube rests upon the plate 19, and then a suitable hammer or press comes down upon the extended portion of the flange 23 and bends it inward upon the upper end of the tube 25. The press or machine at the same time presses down the tongues 31 flat upon the spokes and into the openings from which they were cut originally, so that said tongues will hold the spokes from any possible escape, and all parts, by reason of the spreading of the hub-plates and the hub-tube holding them in their spread position, are under the tension, and a strong durable wheel results therefrom.

The wheel is made for a rubber tire in the same way, and it is substantially the same wheel as shown in the first five figures and described above. In such case as shown in Fig. 6 the rim 10 is nearly semicircular in cross-section and has at intervals openings in it for the spokes 13. The outer ends of the spokes are formed differently from what they are in Figs. 1 and 5, there being merely a small flattened head 40, sufficiently large to prevent the rim from escaping from the spoke. The wheel is assembled in the same manner as before described, the spokes being first inserted through the holes in the rim 10. After the wheel is thus formed the rubber tire may be sprung on in the usual manner.

While we show and describe a hub-tube between the two plates 18 and 19, we do not wish to be limited to a tube, as a solid spindle or axle could be similarly employed for the purpose of holding said plates spread.

What we claim as our invention, and desire to secure by Letters Patent, is—

1. In the process of making a wheel, securing the spokes to the hub by punching tongues out of hub-plates and leaving holes, bending the ends of the spokes, inserting the bent ends of the spokes in said holes in the hub-plates, and placing the punched tongues of the hub-plates back into position against the spokes.

2. In the process of making a wheel, making the hub of two independent movable hub-plates and an independent intermediate tubular member, said hub-plates having central apertures with oppositely-extending flanges surrounding said apertures, securing the inner ends of the spokes to said hub-plates, placing a tubular hub member in said apertures, and turning the flanges surrounding the apertures over the ends of said tubular members.

3. A wheel consisting of a T-rim with transverse spoke-openings through the inwardly-extending annular flange thereof, a pair of hub-plates with transverse spoke-openings, spokes with their outer and inner ends reversely offset at right angles with extremities extending beyond said offset adapted to be inserted through said openings in opposite sides of the rim-flange and hub-plates respectively, and means for holding said hub-plates apart.

4. A wheel consisting of a rim with spoke-openings, a pair of hub-plates having spoke-openings formed by punching out tongues that are bent against the spokes after insertion, spokes fitting in the spoke-openings in said frame and hub-plates, and means for holding said hub-plates apart.

In witness whereof we have hereunto affixed our signatures in the presence of the witnesses herein named.

CHARLES E. HOWE.
   BENJAMIN F. RIX.
   EDWARD P. HOLDEN.

Witnesses as to Charles E. Howe:
 ORANGE BARRETT,
 W. R. WILSON.

Witnesses as to Benjamin F. Rix:
 W. R. WILSON,
 MARVIN J. SCHABERG.

Witnesses as to Edward P. Holden:
 GEO. W. MEYERS,
 ANNA R. STOKOE.